A. Boynton
Saws.

Nº 59,951.      Patented Nov. 27, 1866.

Witnesses;
P. R. L. Peirce
Geo. C. Peirce

Inventor;
Alfred Boynton

United States Patent Office.

IMPROVEMENT IN SAWS.

ALFRED BOYNTON, OF TOWNSHIP OF WRIGHT, MICHIGAN, ASSIGNOR TO EBEN M. BOYNTON, OF GRAND RAPIDS, MICHIGAN.

Letters Patent No. 59,951, dated November 27, 1866.

SPECIFICATION.

TO WHOM IT MAY CONCERN:

Be it known that I, ALFRED BOYNTON, of the township of Wright, county of Ottawa, and State of Michigan, have invented improved cross-cut-saw teeth, which I denominate "Boynton's Double Fleam and Improved Hook Saw Teeth;" and I do hereby declare that the following is a full and exact description thereof, reference being had to the accompanying drawings, and to the letters of reference marked thereon.

The nature of my invention consists in a novel construction of the teeth of saws, whereby I am enabled to produce a saw that works with great ease and rapidity.

Figure 1:
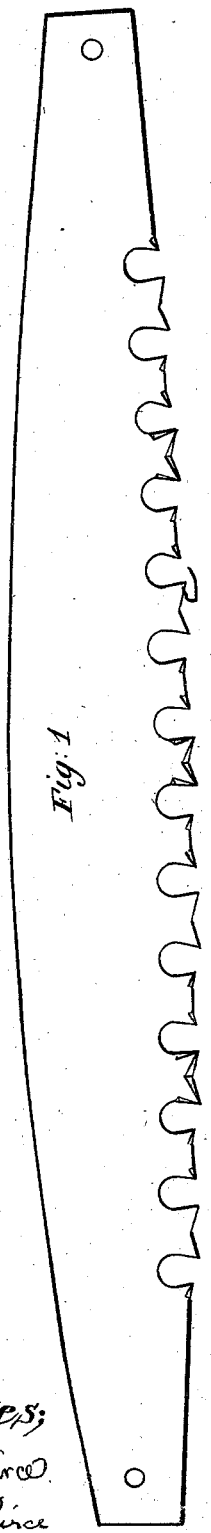
Figure 1 represents a cross-cut-saw made on my improved plan.
Figure 2:
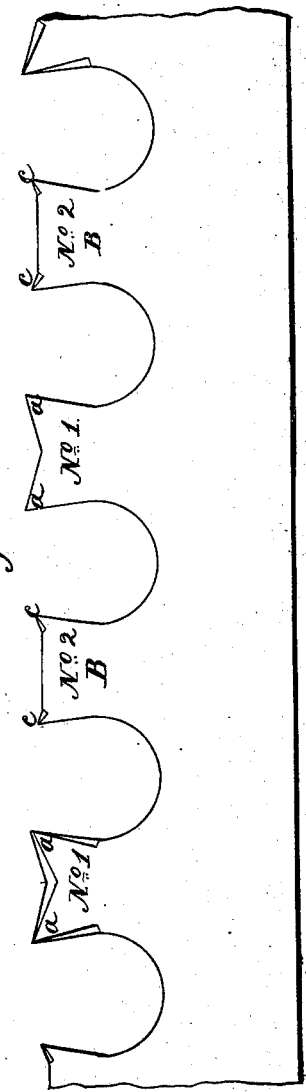
Figure 2 represents a portion of the same on a larger scale.

It has hitherto been usual to construct the teeth of saws of this class, of V shape, in which case the cutting has to be performed by drawing the inclined edge of the teeth across the fibre of the wood, applying more or less pressure thereto. In my invention the tooth is so constructed as to perform the operation of cutting on the principle of the plane bit—the sharp point of the tooth being presented to the wood at an opposite angle from that of the old-fashioned V tooth. I construct the teeth of my improved saw so that their lower ends shall be wider than the body of the tooth above the point, as shown in the drawings. I then form cutting-points, $a\,a$, on the opposite sides of a portion of these teeth, as represented by the teeth marked No. 1, in fig. 2. The centre portion of the lower edge of this tooth is filed away, so as to be lower than the extreme points, $a$, and from the points, $a$, both on the horizontal and on the vertical faces, these teeth are filed bevelling on each side, as represented—the extreme point, $a$, being left of the full width of the thickness of the saw-plate. The teeth thus formed constitute the principal cutting-teeth of the saw; and it will be seen that these points, $a$, are presented to the fibre to be cut, at an acute angle, like a plane bit, and that consequently they will tend to raise the cut portion up from the solid or uncut portion, and will cut it with greater facility and ease. It is obvious that if all the teeth of the saw were formed thus they would hook or catch into the wood in such a manner as either to make the saw jerk and jump, or prevent it from operating at all; and therefore I make each alternate tooth, as represented by the teeth marked No. 2. These teeth are made straight on the greater portion of their horizontal face, as represented at $e$—the points, $c$, being filed bevelling for a short distance back, along the horizontal face, $e$, as shown—their vertical faces being left of full thickness, and perfectly plain. These teeth, No. 2, are made slightly shorter than No. 1, and their faces, $e$, resting on the wood, serve as gauges to regulate the depth to which the points, $a$, can enter the wood. At the same time the points, $c$, serve as cleaners to gather up and carry with them the saw-dust that may be left by the other teeth, though it is obvious that they, too, will operate in a similar manner to some extent, but not to so great an extent, because of their vertical faces being bevelled. By these means I produce a saw that cuts with unusual rapidity and ease.

Having thus described my invention, what I claim, is—

A saw provided with the teeth No. 1 and the cleaner teeth No. 2, arranged and constructed to operate substantially as shown and described.

ALFRED BOYNTON.

Witnesses:
P. R. L. PEIRCE,
GEO. C. PEIRCE.